United States Patent [19]

Vick

[11] 4,183,375
[45] Jan. 15, 1980

[54] MULTI-PATH VALVE STRUCTURE HAVING EXTENDED LIFE

[75] Inventor: Ralph L. Vick, Granada Hills, Calif.

[73] Assignee: The Bendix Corporation, North Hollywood, Calif.

[21] Appl. No.: 856,380

[22] Filed: Dec. 1, 1977

Related U.S. Application Data

[63] Continuation of Ser. No. 697,891, Jun. 21, 1976, abandoned, which is a continuation of Ser. No. 528,177, Nov. 29, 1974, abandoned.

[51] Int. Cl.$^2$ ..................... F15B 13/04; F16K 47/00
[52] U.S. Cl. ........................... 137/625.3; 137/625.69; 251/127
[58] Field of Search ................. 137/625.3, 625.69; 251/127, 118, 324

[56] References Cited

U.S. PATENT DOCUMENTS

| | | | |
|---|---|---|---|
| 3,722,854 | 3/1973 | Parola | 251/127 |
| 3,899,001 | 8/1975 | Orme | 137/625.3 |
| 3,917,221 | 11/1975 | Kubota et al. | 251/127 |
| 3,941,350 | 3/1976 | Kluczynski | 251/127 |
| 4,047,540 | 9/1977 | Orme et al. | 137/625.3 X |

Primary Examiner—Gerald A. Michalsky
Attorney, Agent, or Firm—Robert C. Smith; William F. Thornton

[57] ABSTRACT

Life extending means for a typical spool type servo valve consists of a stack of washer-like disks which cooperate to define a number of finely divided flow paths across the stack in which initial flow, as the spool valve is opened, is forced through alternating chambers and orifices with measured pressure drops across the orifices and wherein subsequent increments of valve travel expose large openings providing flow rates versus travel comparable to conventional spool type valves.

The individual disks may be made comparatively thin such that the thickness of two or more disks is required to provide a normal opening width into the stack. Thus a first disk and a second disk may have openings registering at identical positions to admit flow into the stack as a spool valve land passes the disks. The second disk also has a second opening or set of openings at another position on its inside edge so that as the land passes the second disk, it completes opening the first set of openings and begins exposing the second set of openings into the stack, etc. Thus the flow versus displacement characteristic of the valve may be made quite smooth since a new increment of flow into the stack may be added at every disk width. In another embodiment, flow is initially curtailed by being forced through a set of small series orifices only during a first increment of displacement corresponding to one disk width after which much larger openings are exposed in parallel to the orifices.

14 Claims, 15 Drawing Figures

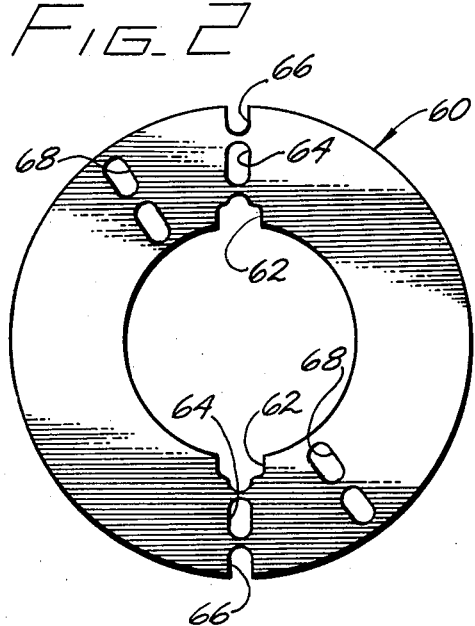
FIG_2
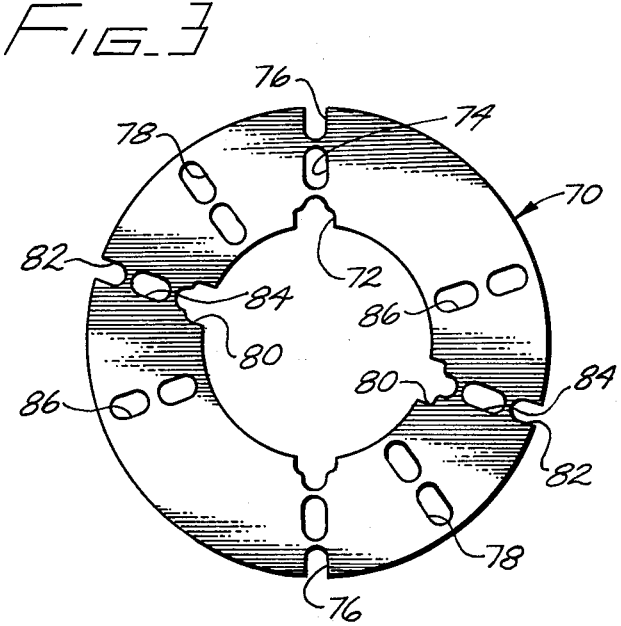
FIG_3
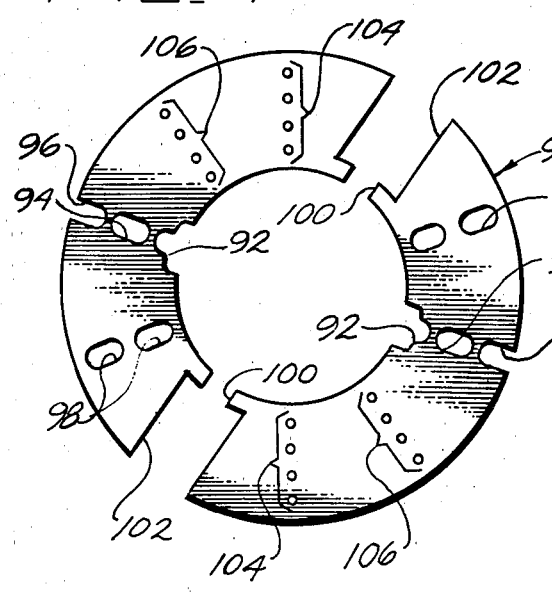
FIG_4
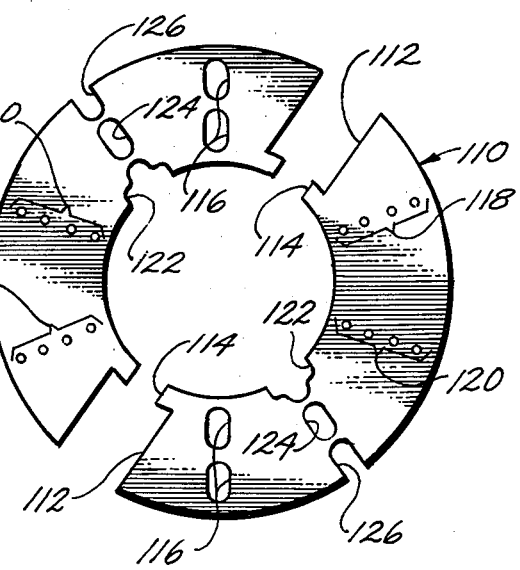
FIG_5

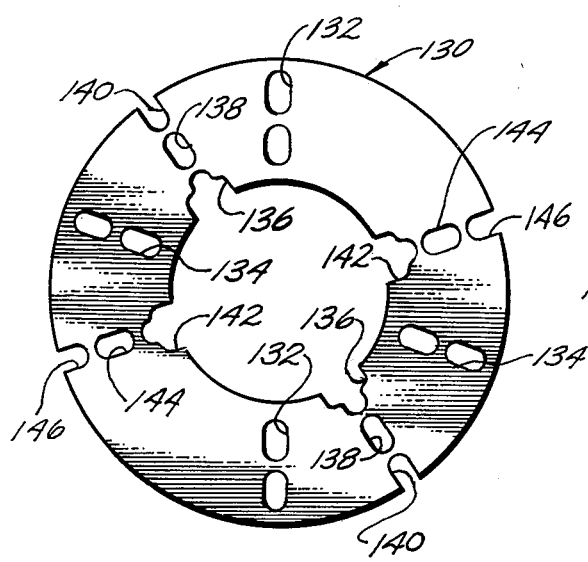
FIG_6
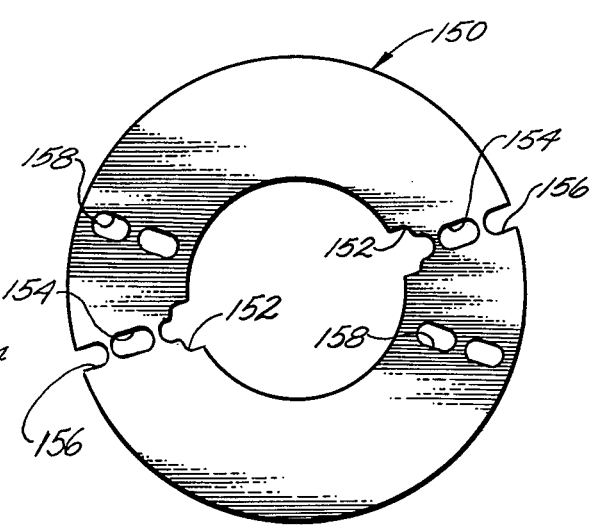
FIG_7
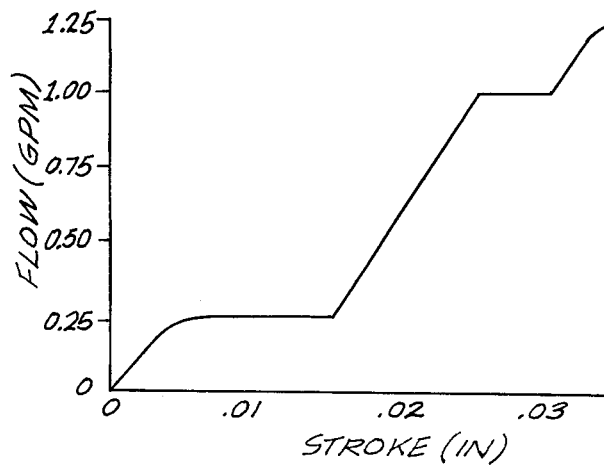
FIG_8
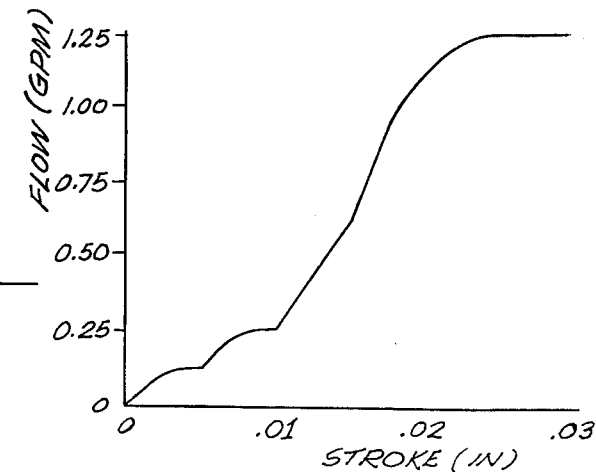
FIG_9

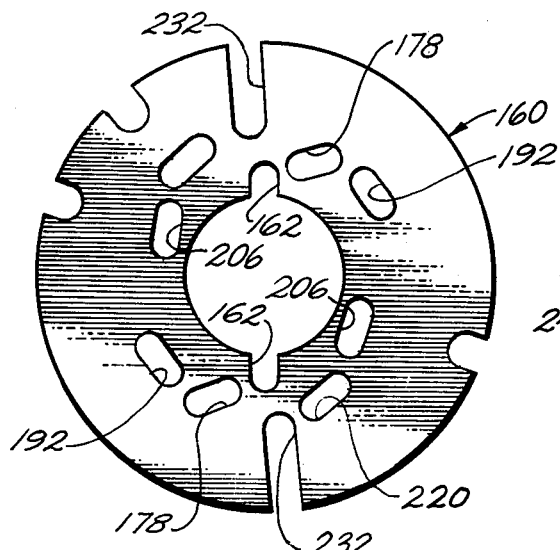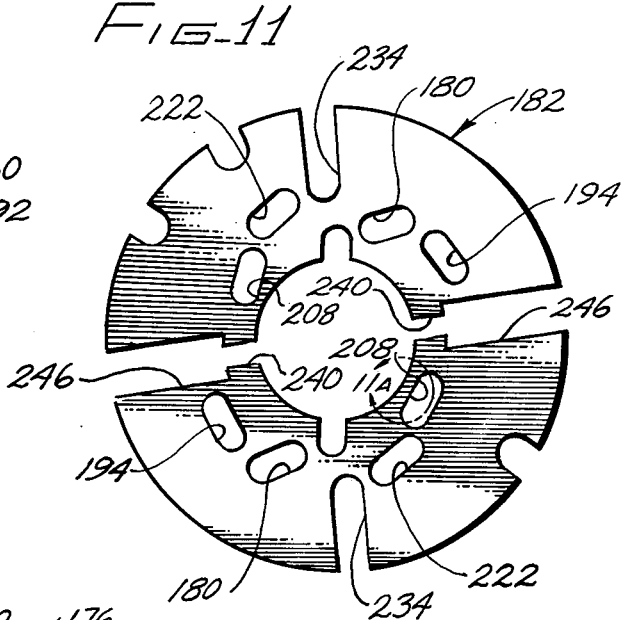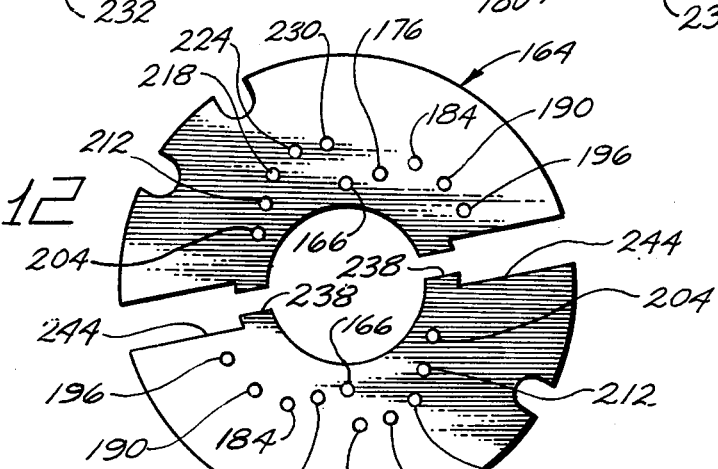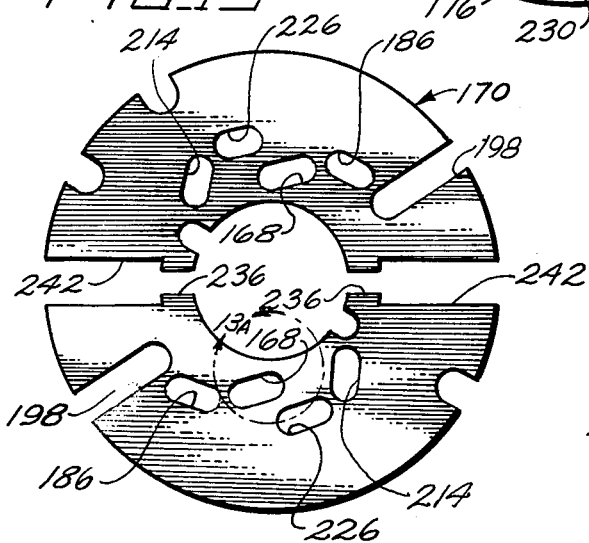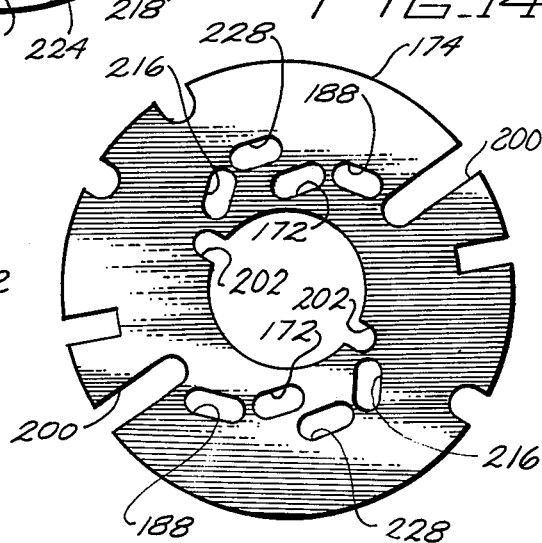

MULTI-PATH VALVE STRUCTURE HAVING EXTENDED LIFE

This application is a continuation of application Ser. No. 697,891, filed June 21, 1976, now abandoned, which is a continuation of application Ser. No. 528,177, filed Nov. 29, 1974, now abandoned.

CROSS-REFERENCE TO RELATED APPLICATION

U.S. patent application No. 293,956 to Ralph L. Vick filed Oct. 2, 1972, now abandoned.

BACKGROUND OF THE INVENTION

In many flow control applications there is a need for structures which can vary the fluid-flow rate of flowing fluids without the production of excessive wear, noise or vibration. The term "throttling" is generally applied to the function of altering or adjusting fluid flow throughout a range of flow rates. The various structures by which the function is performed are generally called "throttling valves" to distinguish them from structures whose function is to open and close a flow path as a step function. To the extent that on-off valves are not opened and closed instantaneously so that throttling noise and vibration may be produced therein at the time of opening or closure, the invention described herein is applicable to such valves as well, and they are included in the term "throttling valve".

A typical control valve for handling the flowing of high pressure fluids employs a structure in which the cross-sectional area of the flow path is altered. This type of structure generally produces substantial noise and vibration and is quite subject to damage from cavitation. However, the structures employed in this arrangement are, as a class, least expensive and most conveniently employed. The conventional spool-type hydraulic servo valve is typical of this type of valve.

Hydraulic systems of commercial aircraft usually employ phosphate-ester-based hydraulic fluids because of their fire-resistant properties. These fluids, however, have been found to be extremely erosive in the throttling or metering control valves of these systems. In effect, they induce an electrochemical milling action on the valve metering edges which is quite apart from the normal wear associated with fluid flow. Improvements have been made in the fluids, and various attempts at valve design changes have effected some gains; however, the problem remains a severe one with valves surviving from only a very few hours to an acceptable life, but still far below that of valves that work in most other fluid systems. The phenomena is characteristic of other fluids; however, the severity with which it occurs it hydraulic systems using phosphate-ester-based fluids is particularly unique.

In systems using phosphate-ester-based fluids, one of the most erosive conditions extant can be found on valves which are rigged or used in a nearly closed condition for long periods of time, or valves which are underlapped (or have zero lap) and remain at null or near null for long periods of time. The configurations involved include flight control system valves, spoiler control system valves, flap control valves (which are modulating types), relief valves that have continuous low leakage or erode to that condition, and other valves that are high differential pressure-throttling configurations with continuous "built-in" or "eroded to" flow conditions. Once flow is established and the "electrochemical milling" begins, the erosion is usually continuous until the leakage rate of the valve is no longer tolerable.

There have been many structures devised in an attempt to deal with the damage resulting from operation of valves in high pressure systems. Most of these have involved some form of baffling means which operate in one way or another to divide the flow and cause the pressure drops to be taken at various locations rather than across a single metering edge. One such arrangement is described in the copending application of applicant, referred to above, in which flow is divided into many fine streams by a series of stacked disks surrounding a spool valve and in which each small stream is caused to flow into a chamber, from thence across an orifice to another chamber, reversing direction through another orifice, etc., radially across the disks. In this arrangement the pressure drops across the disks are essentially those caused by the orifices in series. One problem which has been experienced with this arrangement is that the disks containing the orifices are not configured to receive or discharge fluid, nor are the blank disks. Thus, particularly where a spool valve has very small travel, the thickness of these "dead" disks creates an irregularity in flow which it is preferable to avoid. Even where some of the orifice disks or blank disks are configured to admit fluid into the stack, the flow pattern may be unacceptably rough because each increment of flow, as defined by openings of each disk width, effectively saturates before a new increment begins.

DESCRIPTION OF THE DRAWINGS

FIG. 2 is a plan view of one type of disk used in FIG. 1;

FIG. 3 is a plan view of a second type of disk used in FIG. 1;

FIG. 4 is a plan view of a third type of disk used in FIG. 1;

FIG. 5 is a plan view of a disk similar to that of FIG. 4 but reversed;

FIG. 6 is a plan view of a fourth type of disk used in FIG. 1;

FIG. 7 is a plan view of a disk similar to that of FIG. 2, but reversed and radially displaced;

FIG. 8 is a graph showing a flow vs. displacement characteristic of a prior art type of valve structure;

FIG. 9 is a graph showing the relationship of flow vs. displacement of a valve such as that described in connection with FIGS. 1-7.

FIGS. 10-14 represent a second embodiment of my invention involving a second set or stack of disks in which:

FIG. 10 is a plan view of a first disk which may be used in the valve of FIG. 1;

FIG. 11 is a plan view of a second disk which may be used in the valve of FIG. 1;

FIG. 12 is a plan view of a third disk which may be used in the valve of FIG. 1;

FIG. 13 is a plan view of a fourth disk which may be used in the valve of FIG. 1;

FIG. 14 is a plan view of a fifth disk which may be used in the valve of FIG. 1.

DESCRIPTION OF THE PREFERRED EMBODIMENT

Figure 1:
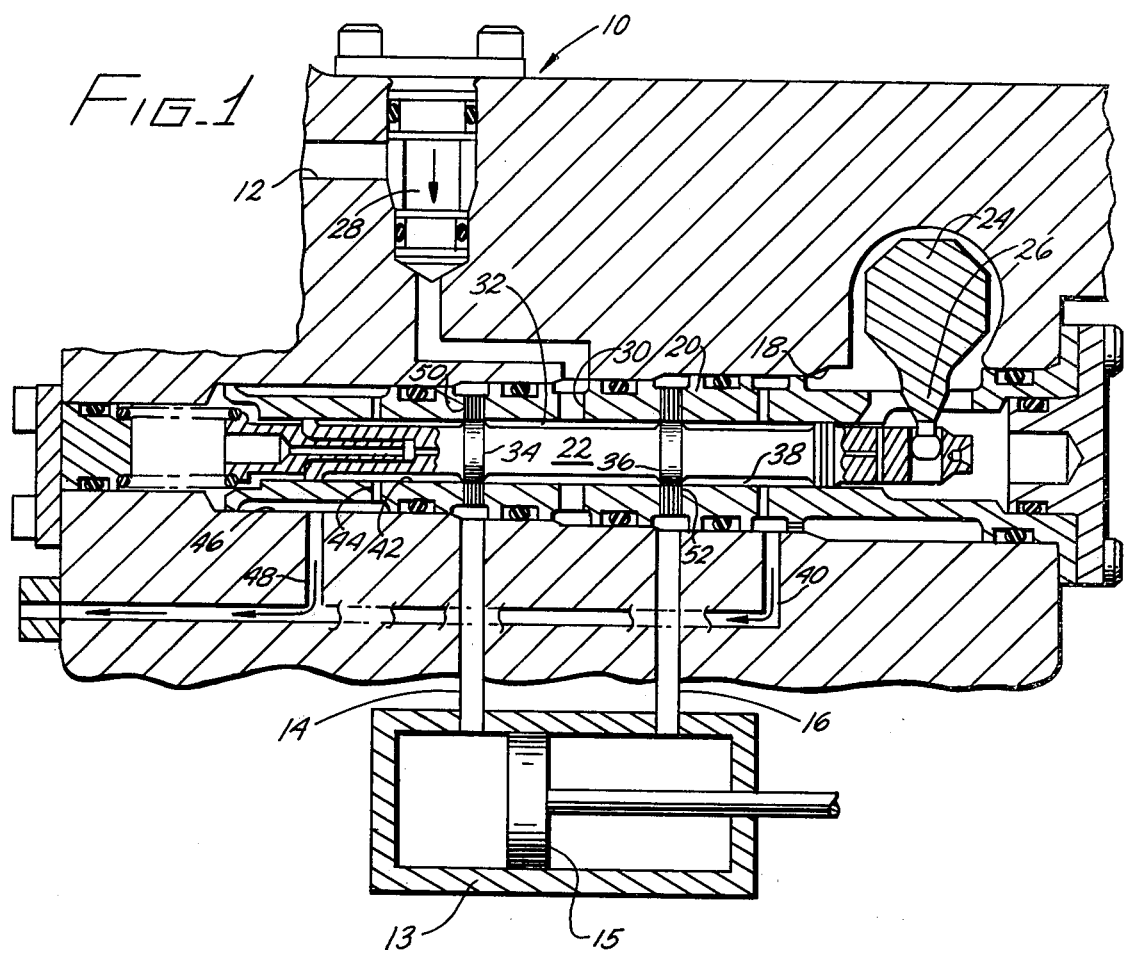
FIG. 1 is a cross-sectional view of a typical spool-type servo valve using my invention.

A flow control valve is shown generally at numeral 10 whose purpose is to control flow to an external utilization device such as a cylinder. Fluid from a source, not shown, is applied to an inlet passage 12, and flow from the valve member 10 is provided to an actuating cylinder 13 through outlet conduits 14 and 16 connected to opposite sides of a piston 15. Positioned within valve 10 is a generally cylindrical chamber 18 having a plurality of different diameters. The stationary sleeve member 20, having a plurality of matching diameters, is positioned in chamber 18. Axially movable within the sleeve 20 is a spool valve 22 which is directly driven mechanically by means of a rotatable control member 24 having an extendible arm 26 engaging the spool member 22.

Fluid flow entering inlet passage 12 passes a conventional check valve 28 and flows through an orifice or series of orifices 30 which are radially positioned through the side wall of sleeve member 20 to provide communication to a chamber 32. Defining the ends of chamber 32 are a pair of lands 34 and 36 movable axially with spool valve member 22 in such manner as to direct high pressure inlet fluid from chamber 32 into either of cylinder passages 14 or 16. When spool member 22 has moved toward the left, land 34 is similarly displaced, thus opening communication between chamber 32 and passage 14. At the same time, land 36 also moves to the left, opening communication between passage 16 and a chamber 38 which communicates with return pressure through a line 40. This results in movement of piston 15 toward the right. Movement of the spool 22 in the opposite direction results in connecting high pressure fluid from chamber 32 to line 16 and permitting fluid on the left side of the cylinder 15 to be exhausted through passageway 14 into a chamber 42 which communicates with return conduit 40 through a line 44, a chamber 46 and a passageway 48, and causing piston 15 to be moved toward the left.

Surrounding each of lands 34 and 36 are stacks of disks 50 and 52, respectively, which are stacked in a face-to-face relationship and which include patterns of openings and orifices which divide the flow into a number of flow paths for minimizing wear, noise and/or erosion damage to the valve which might otherwise result because of the high pressure differentials employed. It will be observed that with the particular valve configuration shown, flow may be directed across the disks either from inside to outside or from outside to inside, depending upon which set of disks is considered and which direction the spool 22 is moved. Because of the smaller effective area on the internal diameter, it is frequently important in this type of valve that the flow versus displacement relationship be reasonably smooth and that abrupt changes do not occur as the spool is moved across one disk element and then another.

The configuration of the individual disks shown in stacks 50 and 52 will become apparent from consideration of the following figures. FIG. 2 shows a disk 60 having a pattern of openings across certain radial lines. Radial orientation of these openings from disk to disk is important in understanding the various flow paths. In the particular embodiment described in FIGS. 2 through 7, openings are arranged along ten equally spaced radii, meaning that a pattern of openings will occur at some point in the stack every 36°. The number of such openings and the number and arrangement of pressure drop orifices across the stack will be defined by the requirements of a particular installation. In order to provide reasonably smooth flow vs. displacement characteristics, the pattern of openings on the inside circumference of the disks will preferably be such as to provide the flow patterns into the stack at each disk position. In disk 60, openings 62 are shown on the inside circumference along a vertical line and along the same line are interior openings 64 and openings 66 at the outside circumference. Displaced 36° counterclockwise from the vertical are sets of interior openings 68. The next disk 70 shown in FIG. 3, which it will be understood is positioned adjacent disc 60, has a corresponding set of openings 72, 74 and 76 along a vertical line. It also has a set of interior openings 78 which correspond exactly with openings 68 in disk 60. In addition disk 70 has, along radii displaced an additional 36° counterclockwise from opening 78, a series of openings including openings 80 leading into the stack from the internal circumference, an internal opening 84 and openings 82 communicating with the outside circumference of the disk. Displaced a further 36° counterclockwise are a series of internal openings 86. Since disks 60 and 70 are preferably of the order of 0.004 or 0.005 inches thick, it will be recognized that openings 62 and 72 in cooperation constitute an opening into the stack of 0.008 to 0.010 inch in width. In general, it is preferred that the width of these passageways not be much less than this, since narrower openings are much more subject to blocking from contamination.

Referring now to FIG. 4, it will be observed that the pattern of openings in this figure is quite different from that of FIGS. 2 and 3. While appearing as a pair of partial disks, this disk is actually formed as a unit and is shown as it would appear after all trimming has been accomplished. The disks are initially formed with both larger outside diameters and smaller inside diameters. Disk 90 has a pattern of openings including openings into the stack 92, an intermediate opening 94 and an opening into the exterior circumference 96 which correspond exactly with openings 80, 82 and 84 in disk 70. There is also a pattern of internal openings 98 which register with openings 86 in disk 70. Displaced an additional approximately 36° counterclockwise from openings 98 are openings 100 which communicate with large slots 102. Also present in disk 90 are a series of small orifices 104 which register directly with the vertically arranged openings 62, 64 and 66 in disk 60 and openings 72, 74 and 76 in disk 70 and also in a position displaced 36° counterclockwise from the openings 104 is a set of orifices 106 which register with openings 68 and 78 in disks 60 and 70, respectively. In FIG. 5 is shown an additional disk 110 which will be stacked adjacent disk 90 of FIG. 4 and which includes a large opening 112 which registers exactly with openings 102 in disk 90 and which communicates with the inside circumference through ports 114. Disk 110 also includes a set of internal openings 116 along a vertical line which register with orifices 104 of disk 90. Displaced 36° clockwise from openings 114 are sets of orifices 118 which register with openings 98 of disk 90. At the next clockwise position on disk 110 are additional sets of orifices which register with openings 92, 94 and 96 of disk 90. At the next position clockwise from orifices 120 of disk 110 is a series of openings including openings 122 into the stack from the internal diameter and intermediate openings 124 and openings 126 on the outside diameter of the disk. These openings register with orifices 106 in disk 90.

In FIG. 6 is shown a disk 130 which includes a series of internal openings 132 at the vertical position which register exactly with openings 116 in disk 110. Rotated two positions counterclockwise is another set of interior openings 134 which register with orifices 120 in disk 110. Rotated one position counterclockwise from the vertically oriented openings 132 are openings 136 in the inside circumference, intermediate openings 138 and openings 140 in the outside circumference, internal openings 144 and openings 146 in the outside circumference of disk 130.

Disk 150 shown in FIG. 7 includes a set of openings 152, 154 and 156 which register exactly with openings 142, 144 and 146 in disk 130. Displaced one position clockwise from these openings are a set of internal openings 158 which register with openings 134 in disk 130.

In considering the operation of a valve such as that of FIG. 1 wherein the disk stacks 50 and 52 are in accordance with the disks shown in FIGS. 2 through 7, one must visualize a stack in which each of the disks is placed on top of the one before in the order described. Assuming such a stack at 52 with disk 60 on the left and with land 36 being slowly moved toward the right, the following flow patterns will develop. As the land 36 moves toward the right, it will progressively uncover disks 60, 70, 90, 100, 130 and 150. The resulting flow pattern is depicted in FIG. 9 (assuming 0.005 inch thick disks). Movement past disk 60 will result in opening flow into the stack through ports 62. These ports communicate directly with the inside orifice of orifice series 104 in disk 90. Flow passing through this orifice will enter a chamber defined by openings 116 and 132 in disks 110 and 130. Flow crossing this opening will then pass through the second of orifices 104, and from thence into a chamber defined by openings 64 and 74 in disks 60 and 70. This chamber communicates with the third of orifices 104 which permits flow into the outside of the chambers defined by openings 116 and 132 of disks 110 and 130, and after flowing radially across this opening the flow passes through the outside of orifices 104 into the port defined by openings 66 and 76 of disks 60 and 70. Because of the flow entrance width of disk 60 relative to the series orifice restriction, the flow reaches a low level and saturates at about 0.12 gallons per minute (illustrative only) as shown in FIG. 9, and no additional flow occurs until the land 34 moves sufficiently far to expose disk 70. As disk 70 is exposed, flow enters the opening 72 and thereby slightly augments the flow pattern just described and, in addition, flows into opening 80 where a new flow pattern is created across the orifices 120 of disk 110, the chambers defined by interior openings 134 and 158 of disks 130 and 150 and the interior openings 84 and 94 of disks 70 and 90, finally leaving the disks at openings 82 and 96 of disks 70 and 90.

A flow pattern identical to and augmenting the flow pattern previously described is shown in FIG. 9 as the second increment extending from approximately 0.005 to 0.01 of the stroke. Further movement of the land 34 past opening 100 places a large flow in parallel with the flow patterns previously described, and this results in a very steep increase in the flow rate with little additional stroke. This is shown in the portion of FIG. 9 extending from a stroke of 0.01 to approximately 0.015. Further movement of the land past disk 110 leaves this large flow in parallel with the earlier flows and also opens an additional path wherein the flow enters the stack through opening 122, crossing the inside of orifices 106 of disk 90 to a chamber defined by the inside of openings 68 and 78 of disks 60 and 70, across the second of orifices 106 into the internal chamber defined by openings 124 and 138 of disks 110 and 130, back across the third of orifices 106 into the chamber defined by the outside of openings 68 and 78, across the outside orifice 106 into the exit opening 126. The effect of this additional flow is shown by the further steepened path of the graph as it appears between approximately 0.015 and 0.02 of the stroke. Further flow in this direction tends to move the system toward saturation, even though additional openings such as those shown at numeral 142 and 152 are exposed.

Assuming now that the land 34 again completely covers the stack 50 and land 34 is then moved toward the left, it will be disk 150 which is first exposed, and the flow pattern resulting from flow into openings 152 is entirely analogous to that which results from the earlier described initial opening into opening 62 of disk 60. Again, movement sufficient to expose openings 142 and 136 of disk 130 provides the second increment shown in FIG. 9, also as previously described. Thus, it will be appreciated that the flow vs. displacement pattern is essentially the same in either direction. However, the same concept can be employed—using more disks—to provide unequal flow patterns in each direction of spool movement.

In an earlier type of stacked disk arrangement, an improvement in wear was achieved with a pattern of fewer openings into the stack; however, the large dead band shown in FIG. 8 as the stroke progressed from 0.005 inch to approximately 0.015 inch was considered to be quite unsatisfactory in terms of response of the servo valve. It is apparent, of course, that the response with the flow pattern such as that shown in FIG. 9 will be considerably better. In this version, the stroke increments over which the flow has reached or approached a saturation are, as a practical matter, so small as to be inconsequential except near maximum flow.

Figure 15:
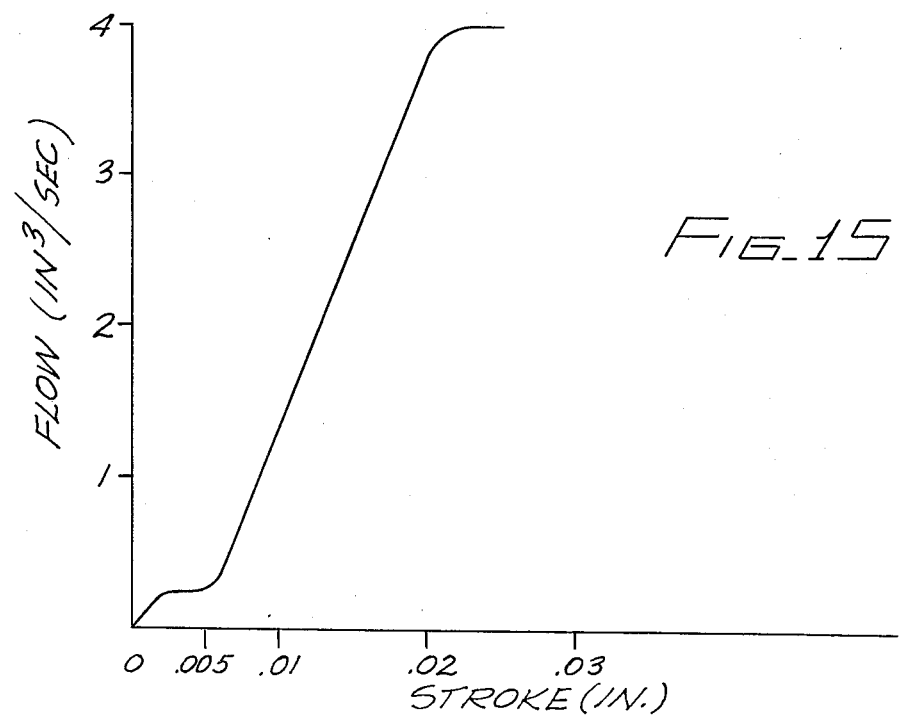
FIG. 15 is a graph showing the relationship of flow vs. displacement of a valve such as that of FIG. 1 wherein the disks of FIGS. 10-14 are used.

A second embodiment of my invention is shown in connection with the disks shown in FIGS. 10 through 14 which operate to produce the somewhat different flow vs. displacement characteristic depicted in the graph of FIG. 15. In the application for which this embodiment was designed, it was found that curtailing the flow only to the extent of approximately one disk thickness was sufficient to avoid excessive wear of the spool and sleeve of the servo valve.

Referring now to FIGS. 10 through 14, again these disks are of the thickness previously described which is 0.004 or 0.005 inch. While five such disks are shown, more may be used in an actual installation to match the stack with the width of the land. For example, in one installation with which applicant was concerned, each stack consisted of one each of the disks of FIGS. 10, 12 and 14 and two each of the disks of FIGS. 11 and 13 arranged side by side.

Assuming now that the disks shown in FIGS. 10 through 14 are arranged in a stack such as that shown at numeral 52 of FIG. 1 and that this stack is initially covered by land 36, the subsequent movement of land 36 one disk width toward the right would permit high pressure fluid in the chamber 32 to flow into the stack through a pair of openings 162 in disk 160 which communicate with orifices 166 in disk 164 (FIG. 12). Orifices 166 communicate with a chamber defined by opening 168 in disk 170 and opening 172 in disk 174. This chamber, in turn, also communicates with an orifice 176 leading to a chamber defined by orifices 178 and 180 in disks 160 and 182. This chamber also communicates with an orifice 184 in orifice plate 164 affording communication with a chamber defined by openings 186 and 188 in disks 170 and 174, respectively. The opposite end of this chamber communicates through an orifice 190 with chambers defined by openings 192 and 194 in disks 160 and 182. From thence, flow passes through an orifice 196 into the outlet passage consisting of slots 198 and 200 in disks 170 and 174, respectively.

Assuming an identical set of disks to be located in FIG. 1 at numeral 50 and these disks to b exactly covered by land 34, movement of land 34 to the left would expose disk 174 in its first 0.005 inch of travel. This would permit flow to enter into the stack through openings 202, and this flow is then immediately communicated with orifices 204 of the orifice plate 164. These orifices communicate with a chamber defined by openings 206 and 208 in disks 160 and 182, respectively. Flow crossing the chamber defined by openings 206 and 208 passes through an orifice 212 into the chambers defined by openings 214 and 216 in disks 170 and 174. This flow is, in turn, directed across the orifice 218 into a chamber defined by openings 220 and 222, from thence across orifice 224 to a chamber defined by openings 226 and 228, from thence across orifice 230 into the exit slot formed by openings 232 and 234. Thus, the flow pattern is entirely analogous to that previously described, and the flow characteristic is also that shown in FIG. 15. In this figure it will be observed that the flow pattern permits a very limited flow for the first 0.005 inch of travel, after which travel the flow proceeds linearly and at a very steep rate until reaching an effective saturation value. As the land 34 moves farther to the left, it will uncover progressively openings 236 of disk 170, 238 of disk 164, and 240 of disk 182. Since these openings communicate with large exit slots 242, 244 and 246, respectively, the flow increases steeply to saturation as shown.

From the foregoing, it will be appreciated that applicant has provided a valve structure which not only provides for a reasonably smooth flow vs. displacement pattern, particularly near null, but which is uniquely capable of dealing with the erosion or electrochemical milling action typical of high pressure hydraulic systems using phosphate-ester-based hydraulic fluids of the type currently used in commercial airline service. Each restriction or orifice is designed to a velocity which will not sustain the erosion or will not sustain it to an unacceptable degree. The variable throttling or metering control action may be permitted to erode initially but only to the point at which the pressure drop is reduced to a value at which the errosion ceases or is stabilized at a very low rate. The remaining throttling or meter control action may be permitted to erode initially but only to the point at which the pressure drop is reduced to a value at which the erosion ceases or is stabilized at a very low rate. The remaining throttling control-pressure drop at the variable metering area can be used quite effectively in that flow gain and pressure gain about null are still acceptable.

If the fixed restriction series does not erode and the variable restriction reaches a point of no erosion, the resultant system limits itself to a point within the allowable leakage since it has been designed to function in this manner. Where an initial zero overlap condition is created by the dimensions of the parts, some slight leakage will occur due to annular clearance and metering edge imperfections, and these edges will eventually break down causing increased leakage and further erosion. This will continue until a stable or nearly stable condition exists since, at this point, the metering edges have been eroded to the point of limiting further erosion. At this point the valve performance is similar to that of a typical underlapped valve. By forming the variable metering edges to presuppose an eroded condition, erosion could be limited from the beginning. This can be accomplished by chamfering the edges of the spool lands, for example.

Those skilled in the art will recognize that there are many configurations of orifices through disks which will give rise to any of a large number of different flow vs. displacement characteristics and also that very similar characteristics could be arrived at with somewhat different structure, depending upon various physical characteristics of the valve structure. If the travel of the spool valve member were very long or the lands particularly wide, more such disks or thicker such disks could be provided, and both thin and thick disks may be used with the thin disks preferably being used to control flow near null and thicker disks near the center of the stack. Obviously, the number of chambers and orifices used is variable with the application. A greater or lesser number of orifices could be used depending upon the pressure drop across the entire assembly. Care must be taken to avoid having an excessively high pressure drop across each orifice since this may result in erosion of the orifices. It may prove advantageous to use both comparatively large orifices and a large number of orifices to avoid possible plugging of the orifices while limiting the pressure drop across each orifice. Also, openings in the external surface of the stack may or may not have to be in the same disk as that containing the internal openings since this is a function of odd or even orifice staging.

I claim:

1. In a flow control valve wherein a spool valve member is movable within a sleeve to open and close fluid passageways in said valve, a rigid structure forming part of said sleeve for dividing the flow entering and leaving said passageways into a plurality of streams comprising a stack of laminar disks having abutting faces and internal edge surfaces adjacent lands of said spool member, said stack of disks including a first flow path across said stack comprising a series of chambers connected to each other through a series of orifices whose pressure drops are limited to values which avoid erosion of said orifices while limiting erosion of the metering edges of said spool valve member, and a second flow path in parallel with said first flow path of large area compared with the areas of said orifices, said stack including a first group of disks at its outside edges each of which includes at least one opening at an internal edge surface thereof communicating with said first flow path and a second group of disks adjacent said first group having a pattern of openings in registry with openings in said first group plus other openings including at least one additional opening at an internal edge surface, at least some disks of said second group also including a large slot communicating with an internal edge opening, said slot providing at least part of said second flow path such that an initial movement of said valve member away from null over a portion of its travel less than approximately one-third its total travel causes flow to be directed through said first flow path and a further movement causes flow to be directed through said second flow path.

2. A flow control valve as set forth in claim 1 wherein said registering openings in said first and second group of disks communicate with said series of orifices.

3. A flow control valve as set forth in claim 1 wherein said stack includes a third group of disks adjacent said second group and said third group of disks includes an opening at an internal edge surface opening into a large slot extending to the outside edge of said disk thereby providing at least a part of said second flow path.

4. A flow control valve as set forth in claim 3 wherein said third group of disks includes said series of orifices communicating with chambers formed by openings in the disks of said first and second groups.

5. A flow control valve as set forth in claim 1 wherein said stack includes a third group of disks, each of said third group of disks including a large slot in registry with the slots in said second group of disks and a series of orifices communicating with chambers formed by openings in the disks of said first and second groups.

6. A flow control valve as set forth in claim 5 wherein said stack comprises, in order, a disk of said first group, two disks of said second group, a disk of said third group, two disks of said second group and a disk of said first group.

7. A flow control valve as set forth in claim 1 wherein said spool valve member has at least two lands, high pressure flow is communicated into a chamber between said lands and a separate stack is provided for each such land whereby movement of said valve member away from a null position in either direction results in essentially the same flow vs. displacement characteristic for said flow control valve.

8. In a flow control valve wherein a spool valve member is movable within a sleeve to open and close fluid passageways in said valve, a rigid structure forming part of said sleeve for dividing the flow entering and leaving said passageways into a plurality of streams comprising a stack of laminar disks having abutting faces and internal edge surfaces adjacent said spool member,
   said stack of disks including a first group of disks each of which has a pattern of openings therethrough including at least one opening at its internal edge surface,
   a second group of disks having a pattern of openings including an internal edge opening and other openings in registry with corresponding openings of said first group plus additional internal and external edge openings,
   a third group of disks having a series of orifices therethrough communicating with the openings in said first group and having a large slot extending from the inside to the outside edges thereof,
   said stack of disks including, in order, at least one of said first group, one of said second group, one of said third group, a second disk of said second group and a second disk of said first group,
   said stack being aligned with at least one land of said spool valve member when said member is in null position such that flow through said stack is blocked and when said land is moved an initial increment from null, flow is directed through said internal edge opening of at least one of said first group of disks, through one of said series of orifices to a chamber defined by registering openings in the other of said first group of disks and the adjacent disk of said second group, across another of said series of orifices to a chamber defined by registering openings in the first of said first and second group of disks and continuing from orifice to chamber until flow passes through an orifice into an outlet passage formed by registering openings in external edge surfaces of two of said disks, and when said land is moved an additional increment, flow is directed through said large slot in parallel with the flow through said orifices.

9. A flow control valve as set forth in claim 8 wherein said stack of disks includes, in order, one of said first group, at least two of said second group, one of said third group, at least two additional disks of said second group, and a second disk of said first group.

10. A flow control valve as set forth in claim 8 in which each of the disks of said second group includes a large slot extending from inside to outside edges thereof, the slots of the disks of said second and third groups of disks being in registry.

11. A flow control valve as set forth in claim 8 wherein said stack of disks includes, in order, one of said first group, one of said second group, two of said third group with slots in registry but otherwise reversed so that said orifices are not in registry, a second of said second group reversed and rotated with respect to the first of said second group, and a second of said first group reversed and rotated with respect to said first of said first group.

12. In a flow control valve wherein a spool valve member including at least two lands is movable within a sleeve to open and close fluid passageways in said valve, each edge of at least two of said lands functioning as a metering edge, a structure forming part of said sleeve adjacent said lands of said spool member for limiting erosive action of phosphate-ester-based fluids in said valve including means defining a series of chambers connected to each other through a series of orifices to form a restricted passageway across said sleeve adjacent each such metering edge of each of said lands at null position, the orifice and chamber sizes being selected such that the pressure drops across said spool member and sleeve over a range of travel of said spool member extending from null less than approximately one-third of the total travel of said spool member are essentially those resulting from the sum of the pressure drops across said orifices and said metering edge, said orifice size controlling the pressure drop across each of said orifices and said metering edge such that electrochemical milling of said orifices and said metering valve edge are limited to an acceptably low rate; and
   a second flow path across said sleeve in parallel with said restricted passageways adjacent each of said lands having metering edges, said second flow path including a slot of large area compared with said restricted passageways and being located such that a small additional displacement of said spool member beyond that required to permit flow through said restricted passageways is required to open said second flow path, displacement of said valve member versus flow through said second flow path being essentially that which would be expected from a comparable valve having no said means forming a restricted passageway across said sleeve.

13. A flow control valve as set forth in claim 12 wherein said second flow path constitutes at least one slot of substantial area positioned in said sleeve such that it is opened with displacement of said spool in either direction away from null to a distance greater than that required to open one of said restricted passageways.

14. In a flow control valve wherein a spool valve member is movable within a sleeve to open and close fluid passageways in said valve, a rigid structure forming part of said sleeve for dividing the flow entering and leaving said passageways into a plurality of streams comprising a stack of laminar disks having abutting faces and internal edge surfaces adjacent lands of said spool member, said stack of disks including a first flow path across said stack comprising a series of chambers connected to each other through a series of orifices whose pressure drops are limited to values which avoid erosion of said orifices while limiting erosion of the metering edges of said spool valve member, and a second flow path in parallel with said first flow path of large area compared with the areas of said orifices, said stack including a first group of disks at its outside edges each of which includes at least one opening at an internal edge surface thereof communicating with said first flow path and a second group of disks adjacent said first group having a pattern of openings in registry with openings in said first group plus other openings including at least one additional opening at an internal edge surface, a third group of disks adjacent said second group, each of said third group of disks including an opening at an internal edge surface opening into a large slot extending to the outside edge of said disk, at least two of said third group of disks including said series of orifices, said stack comprising a disk of said first group, a disk of said second group, at least a first disk of said third group having orifices and a second disk of said third group having orifices with the said large slots in registry but with the said first and second disks of said third group being reversed such that the orifices of said second disk are misaligned with those of said first disk, a second disk of said second group reversed and rotated with respect to said first disk of said second group, and a second disk of said first group reversed and rotated with respect to said first disk of said first group such that an initial increment of movement of said valve member from null produces a first restricted increment of flow, a second increment of movement of said valve member produces a second restricted increment of flow and a third increment of movement of said valve member produces a rapidly increasing increment of flow in parallel with said restricted increments of flow, said first and second increments of movement of said valve constituting less than approximately one-third of the total travel of said valve member.

* * * * *